United States Patent Office 3,074,643
Patented Jan. 22, 1963

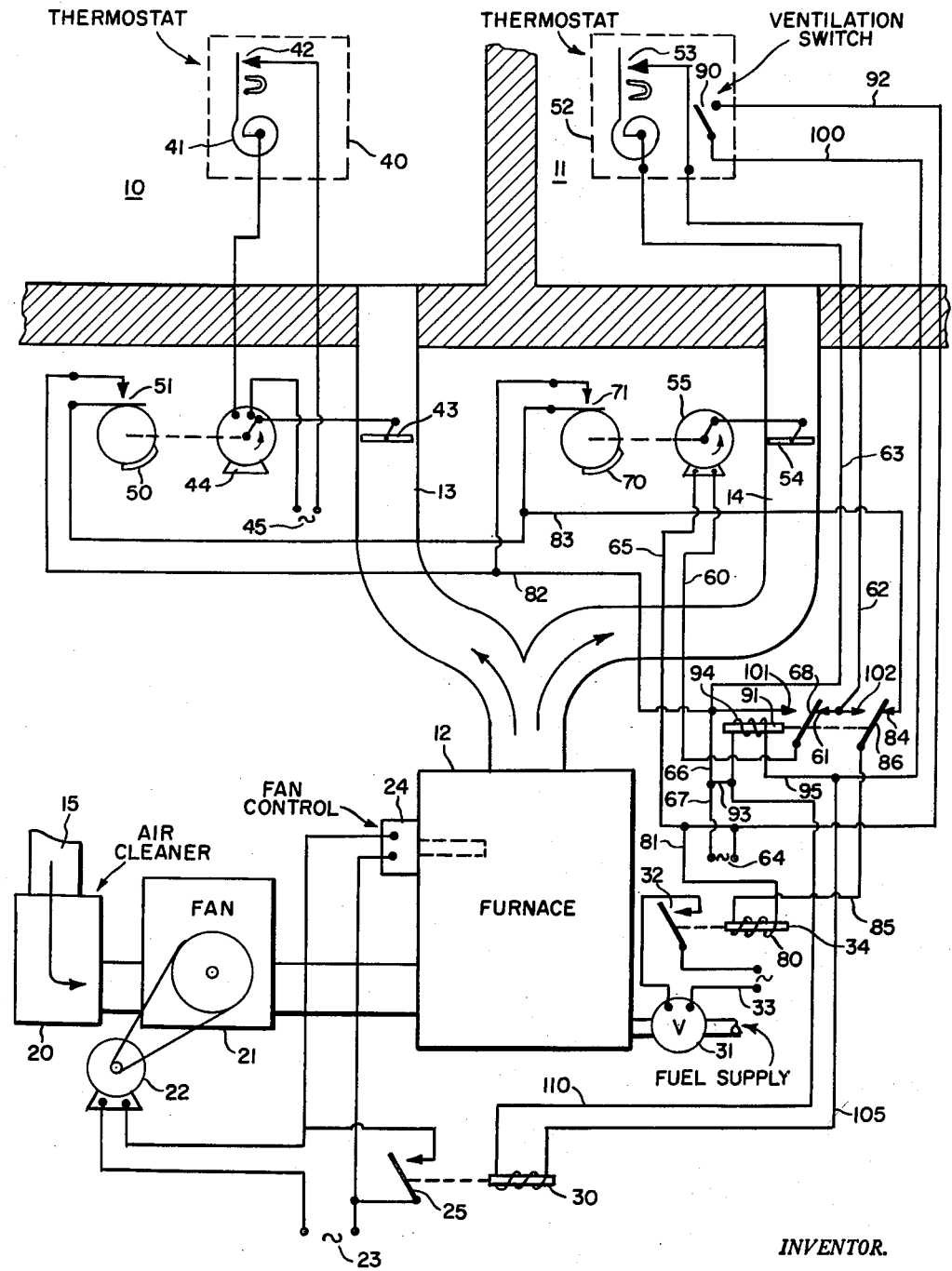

3,074,643
TEMPERATURE CONTROL APPARATUS FOR MULTIZONED BUILDINGS
Lorne W. Nelson, Bloomington, Minn., assignor to Minneapolis-Honeywell Regulator Company, Minneapolis, Minn., a corporation of Delaware
Filed Mar. 23, 1960, Ser. No. 17,040
6 Claims. (Cl. 236—9)

The present invention is concerned with an improved zone control system for a forced air heating installation; in particular, the improvement is in the addition of a selective ventilation feature to provide for maximum ventilation of one of the zones even though there is no need for a change in temperature of that one zone.

Zone control systems for heating have been available for many years. In such systems a room thermostat is generally located in a representative place in each of the zones. The thermostat is connected to control certain apparatus which controls the flow of medium for heating the zone. In a forced air system, each zone thermostat controls a damper in the duct delivering the heated air to the zone. In such zone control systems which do not have complicated duck work such as a face and bypass damper arrangement, the air flow to a zone is shut down as the space or zone thermostat becomes satisfied. In such cases, when the living room is one zone, a large gathering of people in the living room can often result in a satisfaction of the room thermostat and the shutting down of air flow or ventilation to that zone.

With the better air cleaning or filtering methods, such as an electrostatic air cleaner, the importance of ventilation after a zone thermostat is satisfied has been increased. If an expensive heating system is installed in a dwelling with an electrostatic air cleaner, the occupants become dissatisfied when the air in a zone which contains a large gathering of people becomes stale and filled with smoke.

The present invention is concerned with a novel system for providing maximum ventilation in the zones even though one zone may have its thermostat satisfied. In this manner, the maximum effect of air cleaning can be obtained.

An object of the present invention is to provide an improved zone control system;

Another object of the present invention is to provide an improved zone control system having a means for obtaining maximum ventilation.

These and other objects of the present invention will become apparent upon the study of the single figure which shows a schematic representation of the control system applied to a typical forced air heating system.

Referring to the single figure, a forced air heating system is shown for controlling the temperature in two spaces or zones 10 and 11. A conventional forced air heating furnace 12 is connected by supply ducts 13 and 14 to zones 10 and 11, respectively. Air returns from the zones through a return duct 15 to pass through a conventional air cleaner 20 and a fan 21. Fan 21 is driven by a motor 22 which is connected to an A.C. power source 23 by two parallel circuits. A first circuit includes a conventional fan control 24 for energizing fan motor 22 when the temperature of the furnace reaches some predetermined value. Fan control 24 prevents the movement of cold air to zones 10 and 11. A second parallel circuit includes switch 25 which is closed when relay 30 is energized. A fuel supply to furnace 12 is controlled by a conventional valve 31 which is energized when a switch 32 is closed to connect the valve to a source of power 33. Switch 32 is closed when relay 34 is energized.

Zone or space 10 contains a conventional room thermostat 40 which has a bimetal 41 responding to air temperature to close switch 42 when the temperature of the space drops below some predetermined value. A damper or flow control device 43 mounted in duct 13 is controlled by a damper motor 44. Damper motor 44 is a conventional type, such as shown in the Bielski Patent 2,509,471, which is energized by connecting a power source 45 to the motor each time switch 42 closes. The motor output shaft moves in a counterclockwise direction to open damper 43 when the motor is energized. Connected to the output shaft of motor 44 is a cam 50 which closes a switch 51 as soon as motor 44 moves to the wide open damper position.

Zone 11 contains a similar thermostat 52 which has a switch 53. Switch 53 is closed each time the temperature of the air in the space 11 drops below a predetermined value. A damper or flow control device 54 mounted in duct 14 is controlled by motor 55. Motor 55 which is of the same type as motor 44 is normally connected to thermostat 52 to open damper 54 each time the temperature of zone 11 drops below a predetermined value. The circuit connecting switch 53 to motor 55 is traced as follows: from motor 55, a conductor 60, a movable switch member 68, a contact 61, a conductor 62, switch 53, a conductor 63, a conductor 66, a conductor 67, source of power 64, and conductor 65 back to motor 55.

Motor 55 also has a cam 70 connected to an output shaft. Cam 70 closes a switch 71 as soon as motor 55 moves to the wide open damper position. Whenever either one of the zone thermostats 40 or 52 calls for heat by closing switch 42 or 53 to open a respective damper 43 or 54, switch 51 or 71 closes to energize relay 34 to turn on the fuel supply to the furnace. The circuit connecting switches 51 and 71 to relay 34 is traced as follows: from a winding 80 of relay 34, a conductor 81, source of power 64, conductor 67, conductor 66, conductor 82, switches 51 and 71 which are connected in parallel, conductor 83, a switch contact 84, a movable switch member 86, and back to the other side of winding 80 through a conductor 85.

A ventilation switch 90 which is shown mounted in the thermostat 52 of zone 11 is connected to the control system to obtain ventilation. When switch 90 is closed, a relay 91 is energized through a circuit traced as follows: from switch 90, a conductor 92, source of power 64, conductor 67, a conductor 93, a winding 94 of a relay 91, a conductor 95, a conductor 100, and back to switch 90. When switch 90 is closed and relay 91 is energized, movable members 68 and 86 are moved to the left to engage contacts 101 and 102, respectively. The switch formed by contact 101 and movable members 68 closes a circuit to connect motor 55 to power source 64 to energize the motor and open damper 54. The circuit for energizing motor 55 in this manner is traced as follows: from motor 55, conductor 60, movable member 68, contact 101, conductor 66, conductor 67, source of power 64, and back to motor 55 through conductor 65. At the same time thermostat 52 is connected to control relay 34 and thus the supply of fuel to furnace 12 by a circuit traced as follows: from switch 53, conductor 62, contact 102, movable member 86, conductor 85, winding 80, conductor 81, source of power 64, conductor 67, conductor 66, conductor 63, and back to switch 53.

Upon the operation of the ventilation switch 90, the flow of air to zone 11 is increased to a maximum amount by opening damper 54, at the same time, thermostat 52 is placed in control of the furnace 12 to maintain the temperature of the air from the furnace sufficient to satisfy the heating requirements of zone 11.

Under certain conditions best ventilation can be obtained with a constant air circulation. When the ventilation switch 90 is closed, relay 30 is energized to close switch 25 to maintain fan 21 constantly energized. The circuit for energizing relay 30 is traced as follows: from relay 30, a conductor 105, conductor 100, switch 90, conductor 92, source of power 64, conductor 67, conductor 93, and back to relay 30 through a conductor 110.

*Operation*

Under normal operating condition, the zone control system supplies heated air to the zones 10 and 11 as demanded to satisfy thermostats 40 and 52. When the space temperature of zone 10 drops below a predetermined value, switch 42 closes to energize damper motor 44. The damper motor opens damper 43, and at the same time, switch 51 is closed. Switch 51 causes energization of relay 34 to open the fuel supply valve 31. As the air is heated in the furnace and fan control 24 energizes the fan 21, heated air is delivered from the furnace to zone 10. Under the same type of operation, thermostat 52 can open damper 54 to obtain heated air from furnace 12 to satisfy the space heating requirements. Under normal operation, the air flow to zones 10 and 11 is sufficient to obtain the maximum benefit from the air cleaner 20.

Let us assume, zone 11 is the living room of a dwelling. With a large gathering in the living room, zone thermostat 52 becomes satisfied and zone damper 54 closes to shut down the flow of air to that zone. Under such conditions, the air in zone 11 becomes stagnant, and if the people gathered are smoking, the air becomes filled with smoke. Even though the air cleaner 20 is capable of removing smoke, the air cleaner is of no use unless the air from zone 11 is able to circulate by way of the return duct 15 through the air cleaner.

Knowing in advance of the possible gatherings in zone 11 or observing the condition of poor ventilation existing, the occupant of the dwelling closes switch 90. The ventilation switch 90 causes energization of relay 91 to connect the zone thermostat 52 to control the delivery of fuel to the furnace. At the same time, damper 54 is opened to a predetermined wide open position and a maximum air flow through duct 14 is available. With the fan now on continuous circulation upon the energization of relay 30 when the ventilation switch 90 is closed, air moves into zone 11 after passing through air cleaner 20. As long as the temperature of space 11 remained satisfied, the fuel delivery to the furnace is stopped; therefore, even though the air is continually circulating to zone 11, the space temperature will not increase above a selected value as determined by the control point setting of thermostat 52. The system actually is transferred to operate a single zone system where one representative thermostat controls the heat supply and heated air is distributed to a plurality of spaces. The system when modified for maximum ventilation still maintains an upper limit control of all zones. After the gathering of people has left the living room or zone 11, the ventilation switch 90 is opened and the system returns to a conventional zone control system where the zone thermostats 40 and 52 control the supply of heat to the zones.

While the invention has been shown in one particular manner, the scope of the invention is intended to be limited only by the appended claims in which I claim:

1. In temperature control apparatus for controlling the temperature of a multizone dwelling; temperature changing means for changing the temperature of a medium, conduit means connecting said temperature changing means to each of the zones for delivering a quantity of temperature conditioned medium to said zones, flow control means associated with each zone conduit means for controlling the flow of said medium to said zones, single temperature responsive control means in each zone responsive to the temperature in its respective zone, means connecting said temperature responsive means of each zone to said flow control means of said respective zone so a quantity of medium can be delivered to each zone to satisfy said zone temperature responsive means, first control means for energizing said temperature changing means whenever any one of said flow control means is in a position for conditioned medium to be delivered to its zone, and manually operated switch means for connecting one of said temperature responsive means of one of said zones to independently control said temperature changing means, for disconnecting said one temperature responsive means from said flow control means of said one zone for causing said flow control means of said one zone to open for providing for maximum uncontrolled flow of medium to said one zone, and for rendering said first control means of all zones ineffective to control said temperature changing means.

2. In temperature control apparatus for controlling the temperature of a dwelling having a plurality of spaces, temperature changing means having a heat source for providing a supply of heated air, separate conduit means for connecting said temperature changing means to each of said spaces, a fan, means for operating said fan when said temperature changing means is in operation, means connecting said fan to said conduit means whereby heated air is adapted to be supplied to all of the spaces, flow control means in each of said conduit means for controlling the flow of heated air to each of said spaces, single temperature responsive means in each of said spaces responsive to the air temperature therein, means connecting said temperature responsive means of each space to said flow control means of each respective space whereby the temperature of each of said spaces is independently controlled by regulating the flow of heated air to each of said spaces, first control means associated with each of said flow control means connected to control the operation of said temperature changing means when any one of said flow control means is regulated to allow air to flow to one of said spaces, manually operable means for disconnecting one of said space temperature responsive means from its flow control means and connecting said one responsive means to independently control said temperature changing means, further means including said manually operable means for simultaneously causing said flow control means of said one space to open to a maximum position so maximum air flow is obtained in said one space, still further means including said manual operable means for continuously energizing said fan and another means including said manual means for rendering said first control means ineffective to control the operation of said temperature changing means 3. In temperature control apparatus for controlling the temperature of a multizone dwelling; temperature changing means for changing the temperature of a medium, conduit means connecting said temperature changing means to each of said zones, circulation means for circulating the medium through said conduits when said medium is above a predetermined temperature, flow control means associated with each zone for independently controlling the flow of said medium to said zone, temperature responsive control means in each zone responsive to the temperature in the zone, means connecting said temperature responsive means of each zone to said flow control means of said respective zone so a quantity of medium can be delivered to each zone to satisfy said zone temperature responsive means, first control means for energizing said temperature changing means whenever any one of said flow control means is calling for conditioned medium, and first means for disconnecting said temperature responsive means of one of said zones from said flow control means, for connecting said one temperature responsive means to control said temperature changing means, for energizing said flow control means of said one zone for providing for a predetermined flow of medium to said one zone, for rendering said first control means inoperative, and for energizing said circulation means continuously.

4. In temperature control apparatus for controlling the temperature of a dwelling having a plurality of spaces and for providing for continuous ventilation in at least one space when desired, temperature changing means for providing a supply of heated air, conduit means for connecting said temperature changing means to each of said spaces whereby heated air is supplied thereto, flow control means associated with each of said spaces and adapted to control the flow of heated air to each of said spaces, a thermostat in each of said spaces, means connecting said thermostat of each space to said flow control means of each respective space whereby the temperature of each of said spaces is independently controlled by regulating the flow of heated air to said space, first control means associated with each of said flow control means connected to control the operation of said temperature changing means to energize said temperature changing means when one of said flow control means is allowing air to flow to its respective space, and means for connecting one of said space thermostats to independently control said temperature changing means, for rendering said first control means of all flow control means inoperative, and for simultaneously causing said flow control means of said one zone to open to a maximum air flow position.

5. In a temperature control apparatus for controlling the temperature of a multizone building and for selectively providing maximum ventilation of a main zone, conduit means for each zone adapted to receive heated air from a source, control means associated with each conduit means for controlling the flow of air to each zone, single temperature responsive means in each zone connected to said respective control means to control the supply of heated air to maintain the temperature in each zone as selected by said responsive means, second means for selectively adapting said temperature responsive means of said main zone to be the only means to control the temperature of the heated air delivered by the source to all zones and to provide for a predetermined flow of air to said main zone independent of said temperature responsive means.

6. In a temperature control apparatus for controlling the temperature of a multizone dwelling and for selectively providing maximum ventilation of a main zone, separate conduit means for each zone adapted to deliver heated and filtered air from a source, flow control means in each conduit means for controlling the flow of air to each zone, temperature responsive means in each zone connected to said respective flow control means to control the supply of heated air to maintain the temperature in each zone as selected by said respective responsive means, first means effective upon a need for heat by one of said responsive means for energizing a heater in said source, means for selectively adapting said temperature responsive means of one of said zones to control the energization of the heater in lieu of said first means and for providing for a maximum flow of air to said one zone independent of said temperature responsive means of said one zone.

References Cited in the file of this patent
UNITED STATES PATENTS

| | | |
|---|---|---|
| 2,216,281 | Ray | Oct. 1, 1940 |
| 2,235,620 | Nessell | Mar. 18, 1941 |